United States Patent [19]
Wuidart et al.

[11] Patent Number: 5,963,439
[45] Date of Patent: Oct. 5, 1999

[54] DEVICE FOR LIMITING TRANSIENT VARIATIONS OF A SUPPLY VOLTAGE

[75] Inventors: Luc Wuidart, Pourrières; Alain Bailly, Simiane-Collongue; Jean-Michel Ravon, Fuveau, all of France

[73] Assignee: SGS-Thomson Microelectronics S.A., Saint Genis, France

[21] Appl. No.: 08/953,580

[22] Filed: Oct. 17, 1997

[30] Foreign Application Priority Data

Oct. 22, 1996 [FR] France .................................. 96 13088

[51] Int. Cl.$^6$ ........................ H02M 1/14; H02M 7/5387
[52] U.S. Cl. ............................. 363/46; 363/58; 361/111
[58] Field of Search ................................ 363/46, 56, 57, 363/58, 132; 361/90, 91, 94, 111

[56] References Cited

U.S. PATENT DOCUMENTS

| | | | |
|---|---|---|---|
| 3,869,658 | 3/1975 | Hanke et al. | 321/2 |
| 4,378,580 | 3/1983 | Stich | 361/91 |
| 4,953,070 | 8/1990 | Lenz | 363/58 |
| 5,093,771 | 3/1992 | Harvest | 363/98 |
| 5,422,562 | 6/1995 | Mammano et al. | 323/282 |
| 5,521,809 | 5/1996 | Ashley et al. | 363/71 |

*Primary Examiner*—Adolf Deneke Berhane
*Attorney, Agent, or Firm*—Wolf, Greenfield & Sacks, P.C

[57] ABSTRACT

The present invention relates to a device for limiting transient variations of a voltage for supplying a load from a dc/dc converter, including an input terminal, that receives the voltage provided by the converter, and connected to an output terminal of the device connected to the load; a first power transistor connected between a supply voltage of the converter and the output terminal; a second power transistor connected between the output terminal and the ground; and means for linearly and individually controlling each power transistor in case of an abrupt variation of the load.

29 Claims, 3 Drawing Sheets

DEVICE FOR LIMITING TRANSIENT VARIATIONS OF A SUPPLY VOLTAGE

BACKGROUND OF THE INVENTION

1. Field of the Invention

The present invention relates to the field of dc/dc power converters, such as switched-mode power supplies or linear voltage regulators, meant to supply a load with a regular voltage of fixed value. The present invention more specifically applies to the maintaining of the supply voltage of the load even in case of an abrupt current variation therein. For example, the present invention applies to power converters for supplying a microprocessor, the current surge of which may vary, at a relatively high recurrence frequency (from about a few hertz to a few kilohertz), between a few mA and 15 or 15 A, or even more.

2. Discussion of the Related Art

The increase in microprocessor performance requires power converters which have better and better voltage stability and respond more and more rapidly to a variation of the load. For example, a converter for supplying a microprocessor known under trade name "PENTIUM-PRO" of make "Intel" has to withstand a current variation from 0.3 A to 10 A in 350 ns with a voltage accuracy of 5%.

Several conventional solutions are used to improve the response of the converter to such abrupt current variations.

FIG. 1 shows an example of a conventional scheme for supplying a microprocessor. A dc/dc converter 1 receives a supply voltage Ve, for example of +12 volts or +5 volts, and provides a voltage Vin to a microprocessor 2. The value of voltage Vin (for example, from +2.1 volts to +3.5 volts) is generally set by microprocessor 2 which communicates with converter 1 via a digital link 3. Several chemical storage capacitors C are connected in parallel between supply line Vin and the ground to limit the transient variations of voltage Vin due to a variation of the current surged by microprocessor 2. One or several ceramic decoupling capacitors C' are generally connected between a supply terminal S of the microprocessor receiving voltage Vin and the ground. A disadvantage of this solution is that very high capacitance capacitors, which must further have very low equivalent series resistances and inductances, are very expensive. A conventional solution such as shown in FIG. 1 typically requires, for the above example of a "PENTIUM-PRO" microprocessor, ten chemical capacitors of 1,500 $\mu$F, each having an equivalent series resistance of 44 m$\Omega$, to reach a capacitance higher than 4,000 $\mu$F with an equivalent series resistance lower than 5 m$\Omega$ corresponding to the constraints set by the manufacturer. Further, the equivalent series inductance of a capacitor generally is around 10 mH.

Another solution, which is applicable if the power converter is a switched-mode supply (PWM), is to operate the switched-mode supply at high switching frequencies. If such a solution requires chemical capacitors with a lower capacitance between the converter and the microprocessor, their equivalent series resistances and inductances remain critical as concerns their cost. Further, the concept of a switched-mode supply operating at 500 kHz, or even more, requires the use of high-performance components, especially to stabilize the feedback loop while taking into account the behavior of the components and of the pattern of the printed circuit at such a high frequency.

SUMMARY OF THE INVENTION

The present invention aims at providing a new solution to limit the deviation of the supply voltage of a microprocessor after an abrupt variation in the current surged by the microprocessor.

More generally, the present invention aims at providing a device for limiting transient variations of the supply voltage of a load having a current likely to undergo abrupt variations, based on a power converter.

The present invention also aims at providing a device which does not require any modification of the power converter.

The present invention further aims at providing a device which is independent from the type of power converter (switched-mode supply or linear regulator) used.

To achieve these and other objects, the present invention provides a device, for limiting transient variations of a voltage for supplying a load from a dc/dc converter, including an input terminal that receives the voltage provided by the converter, and connected to an output terminal of the device connected to the load; a first power transistor connected between a supply voltage of the converter and the output terminal; a second power transistor connected between the output terminal and the ground; and means for linearly and individually controlling each power transistor in case of an abrupt variation of the load; each power transistor being controlled by a differential amplifier receiving, as inputs, the supply voltage of the load and a variable reference voltage; which is a function of the voltage provided by the converter.

According to an embodiment of the present invention, the device includes a circuit for generating the variable reference voltages receiving, via a first resistive and capacitive cell, the voltage provided by the converter.

According to an embodiment of the present invention, the device includes a protection circuit for limiting the duration of conduction of each power transistor.

According to an embodiment of the present invention, the protection circuit includes means for inhibiting the operation of the control means of the power transistors after a predetermined duration which follows the operation of one of the control means.

According to an embodiment of the present invention, the protection circuit includes, for each amplifier, a comparator receiving, as inputs, the voltage provided by the converter assigned with a delay lower than the time constant of the first RC cell and a variable threshold voltage, intermediate between the variable reference voltage of the amplifier with which the comparator is associated and the voltage filtered by the first RC cell.

According to an embodiment of the present invention, the protection circuit further includes a means for inhibiting the operation of the means for controlling the power transistors when the voltage issued by the converter is lower than a predetermined threshold.

According to an embodiment of the present invention, the device further includes two output terminals connected to the power converter and indicative of the operation of each power transistor.

The present invention also relates to a system for supplying a load, including a power converter and a device for limiting the variations of the supply voltage of the load.

According to an embodiments of the present invention, the converter is of the switched mode supply type controlled by a pulse width modulation and includes means for forcing its own control during an activation of one of the power converters.

According to an embodiment of the present invention, the power converter provides a linear regulation of the input voltage on a reference value.

These objects, characteristics and advantages as well as others, of the present invention, will be discussed in detail in the following non-limiting description of a specific embodiment made with reference to the accompanying drawings.

DETAILED DESCRIPTION

Figure 1:
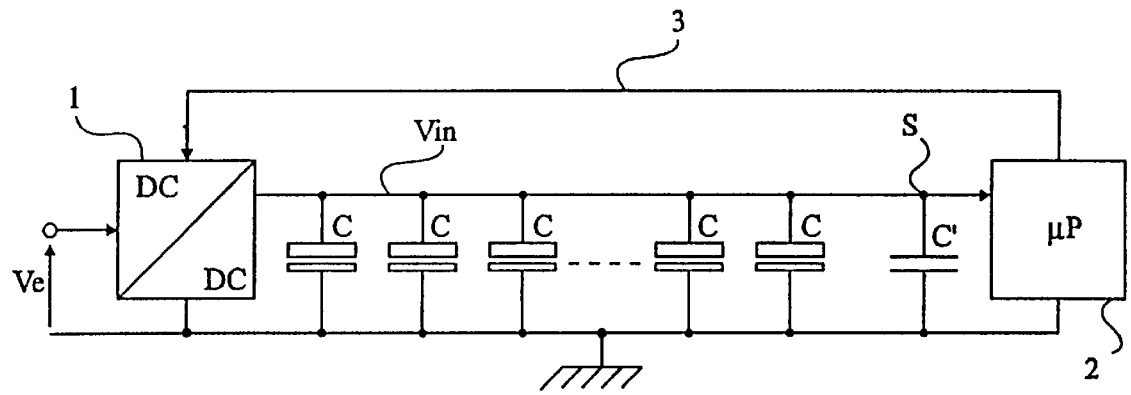
FIG. 1, previously described, is meant to show the state of the art and the problem to solve.

The same components have been designated by the same references in the different drawings. For clarity, only the components necessary for the understanding of the present invention have been shown in the drawings.

Figure 2:
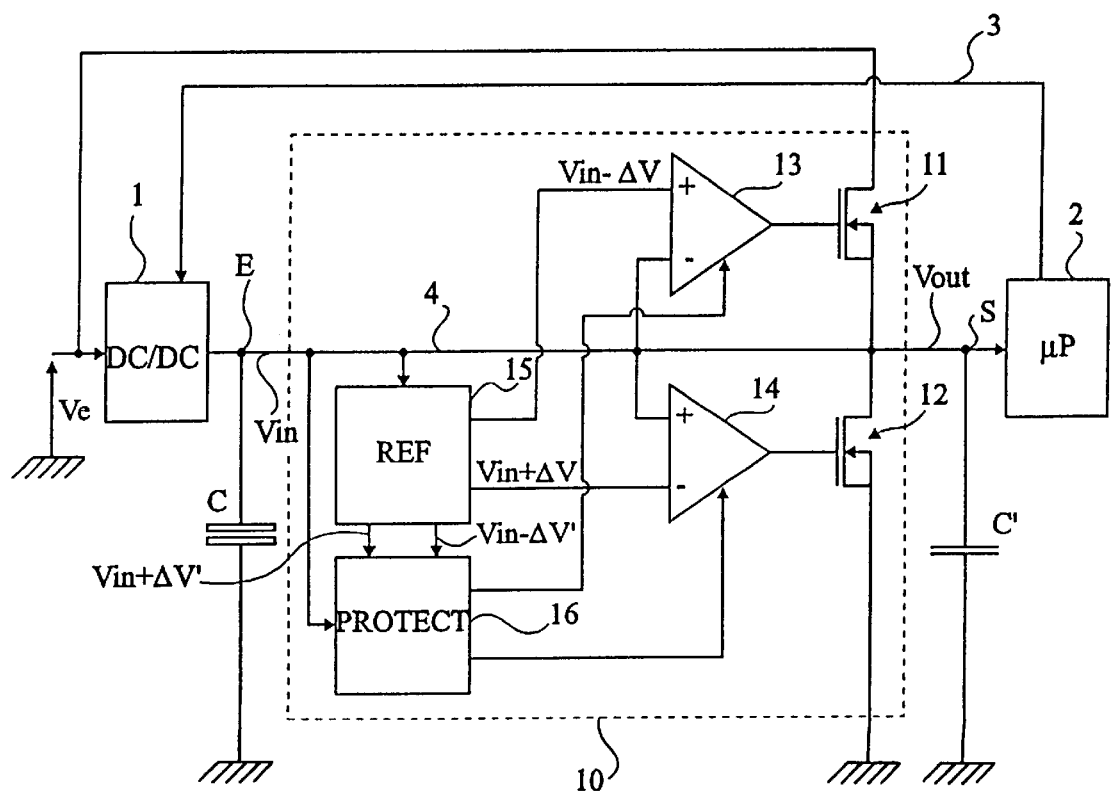
FIG. 2 shows, in the form of block-diagrams, a first embodiment of a device according to the present invention, associated with a power converter and with a microprocessor.

FIG. 2 schematically shows a first embodiment of a device 10, according to the present invention, for limiting transient variations of a supply voltage Vout provided by a power converter 1 to a load 2. Device 10 is, according to the present invention, meant to be connected in parallel to the load, for example, a microprocessor 2. In the form of an integrated circuit, device 10 is placed on a line 4 connecting an output terminal E of converter 1 to a supply terminal S of microprocessor 2.

A chemical capacitor C, inherent to the operation of the converter (to filter the voltage undulation at the converter output), is placed between terminal E and the ground. The function of this high capacitance capacitor now is to filter the switching peaks of converter 1. One or several ceramic decoupling capacitors C' are, conventionally, placed in parallel between terminal S and the ground.

For clarity, and although they are identical, the voltage of terminal E will now be called Vin and the voltage on terminal S will be called Vout.

According to the present invention, device 10 includes two power stages connected between line 4 and, respectively, a voltage Ve corresponding to the input voltage of converter 1 and the ground. An upper stage, formed by an N-channel MOS power transistor 11 is meant to provide additional energy to microprocessor 2 in case of a brutal current surge. A lower stage, formed by an N-channel MOS power transistor 12, is meant to absorb an excess energy in case of an abrupt fall of the current surge.

Each transistor 11, 12 is associated with a differential amplifier 13, 14 for amplifying an error voltage between voltage Vout and a reference voltage associated with each transistor. The time of response of amplifiers 13 and 14 to a variation of the error voltage must be very fast and these amplifiers are thus designed to have a high pass-band and open-loop gain (for example, respectively, about 10 MHz and about 100 to 300).

According to the present invention, each power stage operates only when power converter 1 cannot, by itself, absorb a current variation without causing a transient variation of voltage Vout, that is, only during the transient periods of abrupt variation of the current surged by the microprocessor. Further, voltage Vout is maintained in a deviation range around the voltage Vin issued, before intervention of device 10, by converter 1. For this purpose, device 10 includes a block 15 for generating two variable reference voltages Vin−ΔV and Vin+ΔV which are functions of filtered voltage Vin, and which are respectively associated with amplifiers 13 and 14. Thus, a range of 2ΔV of variation of voltage Vout is set around voltage Vin. In the embodiment of FIG. 2, the inverting input of amplifier 13 receives voltage Vout and its non-inverting input receives voltage Vin−ΔV. The inverting input of amplifier 14 receives voltage Vin+ΔV and its non-inverting input receives voltage Vout.

Preferably, device 10 further includes a protection block 16, for avoiding excessive energy dissipation in transistors 11 and 12, for example, in case of a durable modification or a disappearing of voltage Vin issued by converter 1. Block 16 uses two intermediary threshold voltages Vin−ΔV', Vin+ΔV', between reference voltages Vin−ΔV and Vin+ΔV, the function of which will be better understood in relation with FIG. 3. These threshold voltages are supplied by block 15 and depend on voltage Vin.

An advantage of the present invention is that it replaces the series of high-capacitance chemical capacitors of conventional solutions, to only keep one capacitor C, inherent to the operation of a conventional converter, while replacing the other chemical capacitors with an integrated circuit.

Figure 3:
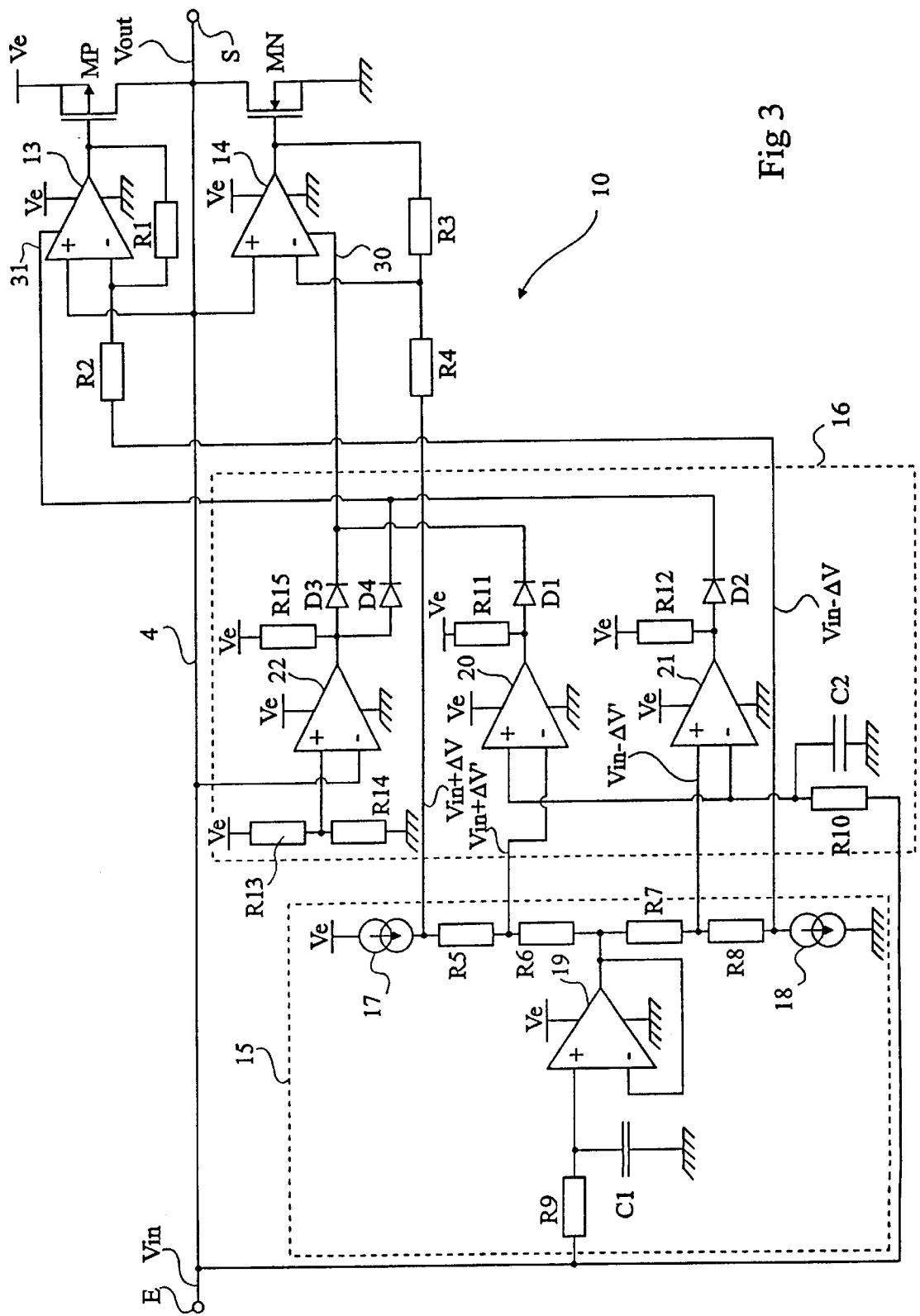
FIG. 3 shows a detailed circuit diagram of a second embodiment of a device according to the present invention.

FIG. 3 shows a detailed diagram of a second embodiment of a device 10 according to the present invention. This second embodiment differs from the embodiment of FIG. 2 by its use of two P-channel and N-channel, respectively, MOS power transistors MP and MN. This difference simply results in the inverting of the inputs of amplifier 13, the non-inverting input of amplifier 13 now receiving voltage Vout while its inverting input receives reference voltage Vin−ΔV.

The operation of the device is similar in the two embodiments. The choice between these embodiments will depend, for example, on the supply voltage of the system. For example, for a voltage Ve of +5 volts, the second embodiment can be chosen, since a P-channel transistor will then be easier to control than an N-channel transistor in the upper stage, due to the low supply voltage. For a higher supply voltage, for example, 12 volts, the first embodiment can be chosen. However, the choice is not critical.

To simplify the present description, it will be considered hereafter that all components of device 10 are supplied with voltage Ve. In practice, except for transistors MP and MN, these components will be supplied from a filtered voltage, generated from voltage Ve. Similarly, local decoupling capacitors on the reference inputs of amplifiers 13 and 14 and the use of distinct ground signals have not been shown. Further, the supply of the amplifiers will be locally filtered in order to obtain a good noise rejection rate. Moreover, in the form of an integrated circuit, the traces carrying the input signals of amplifiers 13 and 14 will be as close as possible to their reference or return track to avoid that the loops formed by these pairs of traces collect the magnetic field generated by the very close strong current variations.

Each amplifier 13, 14, is associated with two resistors selected to determine an important gain. A first resistor R1, R3, connects the inverting input of amplifier 13, 14, to its output. A second resistor R2, R4, connects the inverting input of amplifier 13, 14, to an output of circuit 15 issuing reference voltage Vin−ΔV, Vin+ΔV.

Generation circuit 15 includes four resistors R5, R6, R7, R8, connected in series between two current sources 17, 18, respectively connected to potential Ve and to the ground. The midpoint of the series association of resistors R6 and R7 receives, via an amplifier 19, connected as a follower for an impedance matching function, voltage Vin filtered by means of a resistor R9 and of a capacitor C1. Resistor R9 connects terminal E to the non-inverting input terminal of amplifier 19. Capacitor C1 is connected between the non-inverting input of amplifier 19 and the ground. The inverting input of amplifier 19 is connected to its output, and thus to the midpoint of the association of resistors R6 and R7. Voltages Vin−ΔV and Vin+ΔV are respectively taken between resistor R8 and current source 18 and between resistor R5 and current source 17. Value ΔV (for example, 50 mV) is set according to the tolerances required for the stability of the supply voltage of the microprocessor. Cell R9/C1 enables adaptation of the variable reference voltages to durable modifications of voltage Vin, for example, in case of a modification by the microprocessor of the voltage check carried by link 3, while guaranteeing stable references for the control of power transistors MP and MN.

When voltage Vin is stable, the respective output potentials of amplifiers 13 and 14 are substantially equal, respectively, to potential Ve and to the ground. Thus, transistors MP and MN are blocked (non-conductive).

In case of an abrupt current surge by microprocessor 2, voltage Vout falls if the converter cannot immediately provide this additional current. Thanks to the time constant of cell R9/C1 and to the rapidity of amplifier 13 to respond to a variation of its differential input voltage, the output potential of amplifier 13 almost immediately starts decreasing, which causes transistor MP to turn on and, thus, supply an additional current directly drawn from the system supply. The operation of amplifier 13 associated with transistor MP here resembles the operation of a linear regulator but with a variable reference voltage Vin−ΔV. It will be provided to enable amplifier 13 to quickly leave its saturated state. Indeed, in steady state (that is, in the absence of variation of the load), transistor MP has to be blocked, letting amplifier 13 have a reference voltage Vin−ΔV lower than output voltage Vout. In such conditions, the output stage of amplifier 13 is saturated in the high state.

Similarly, in case of an abrupt drop of the current surge by the microprocessor, voltage Vout increases if this current drop cannot be immediately absorbed by the converter. This increase in voltage Vout is almost immediately translated by amplifier 14 by turning-on transistor MN which then absorbs the excess current. While transistor MN is on, voltage Vout is limited to a value which depends on the gain of amplifier 14, preferably, to Vin+ΔV. Value ΔV is chosen according to the tolerances required for the stability of voltage Vout while taking into account the closed-loop gain of amplifiers 13 and 14 so that voltage Vout is always included in the tolerance range.

It should be noted that as soon as the converter restores voltage Vin at the predetermined value that it is meant to regulate, amplifier 13 or 14 returns to its initial state, thus blocking transistor MP or MN. Preferably, amplifiers 13 and 14 have a low output impedance to guarantee the stability and the rapidity of the upper and lower stages.

It should be noted that amplifiers 13 and 14 do not have the function of maintaining the voltage provided to the microprocessor at a predetermined reference value as it is the case for a conventional linear regulator. Amplifiers 13 and 14 thus do not require great accuracy.

During the integration of device 10, the connection of amplifiers 13 and 14 to measure voltage Vout on line 4 will be, preferably, performed upstream of the series of decoupling capacitors C'. Thus, while it is generally desired to take the feedback voltage of a control amplifier of a MOS transistor operating in linear mode as close as possible to the load, it will be preferred to take this voltage as close as possible to the drain (or the source) of the transistor.

An advantage thereof is that this makes the stability of device 10 independent from the connecting mode used for decoupling capacitors C' (for example, stellate, in stellate groups, etc.). Further, such a connection to the decoupling capacitors provides a phase lag which increases the stability due to the low inductance created by the connection between the output of device 10 and the association of capacitors C'. Moreover, the detection of the feedback voltage of amplifiers 13 and 14 is thus performed within the integrated circuit which thus has a single output to be connected as close as possible to one of decoupling capacitors C'. The ground terminal of the integrated device according to the present invention will also be connected as close as possible to this capacitor.

Protection circuit 16 is meant to introduce a maximum duration of conduction of transistor MP or MN if the converter takes a long time to regulate voltage Vin. Circuit 16 is optional and does not intervene on the limitation of the deviation of the voltage provided to the microprocessor around voltage Vin. Indeed, the time constant of cell R9/C1 is chosen to be large enough (for example, around 100 ms) for the variable voltage references to be stable enough and stay in a relation with the voltage value that the converter is supposed to maintain.

Circuit 16 includes two differential amplifiers 20, 21, connected as comparators and respectively associated with the lower and upper stages. Comparator 20 receives, on its inverting input, threshold voltage Vin+ΔV' taken at the midpoint of the series association of resistors R5 and R6. Comparator 21 receives, on its non-inverting input, threshold voltage Vin−ΔV' taken at the midpoint of the series association of resistors R7 and R8. The non-inverting input of comparator 20 and the inverting input of comparator 21 are connected to the midpoint of a series association of a resistor R10 and of a capacitor C2 between terminal E and the ground. The function of cell R10/C2 is to generate a small delay at the taking into account of the variations of the voltage of line 4 by comparators 20 and 21. The respective outputs of comparators 20 and 21 are connected to a terminal 30, 31, for inhibiting the operation of amplifiers 14 and 13. For example, the operation of amplifiers 13 and 14 is inhibited as they receive a current on this terminal. In the example shown in FIG. 3, the output stages of amplifiers 20 and 21 have open collectors. Accordingly, the respective outputs of comparators 20, 21, are connected, via a resistor R11, R12, to voltage Ve, and a diode D1, D2, is interposed between the output of comparator 20, 21, and terminal 30, 31, of amplifier 14, 13.

The time constant of cell R10/C2 is, according to the present invention, much lower than the time constant of cell R9/C1 so that a variation of voltage Vout may be transmitted on the inputs of comparators 20, 21, while the respective thresholds Vin+ΔV' and Vin−ΔV' of these comparators remain stable. For example, the value of ΔV' is around 25 mV and the time constant of cell R10/C2 is about a few milliseconds.

When voltage Vin is stable, the respective outputs of comparators 20 and 21 are at the low level. Thus, amplifiers 13 and 14 can respond to a variation of voltage Vin.

When the upper stage is active, voltage Vin is rapidly limited to a value close to Vin−ΔV. The potential of the inverting input of comparator 21 will thus decrease with the slight delay set by cell R10/C2. As soon as this potential becomes lower than threshold Vin−ΔV', the output of comparator 21 switches and a current is sent to terminal 31. Thus, the upper stage is deactivated and transistor MP is blocked. If such a situation occurs, this indicates a lasting dysfunction of converter 1 and, of course, the supply voltage of the microprocessor can no longer be maintained. Similarly, when the lower stage is active, it is deactivated as soon as the potential of the non-inverting input of comparator 20 becomes higher than Vin+ΔV'.

Preferably, protection block 16 includes a third comparator 22, formed by a differential amplifier and meant to deactivate device 10 when voltage Vin is lower than a predetermined threshold. This deactivation occurs, for example, upon the starting of the converter to avoid that device 10 operates as long as voltage Vin has not reached this predetermined value. Thus, it is avoided that the power stages of device 10 are activated by incorrect voltage references due to a saturation of current source 18 when voltage Vin is too low.

The predetermined switching voltage of comparator 22 is set by a series association of resistors R13 and R14 between voltage Ve and the ground. The midpoint of this series association is connected to the non-inverting input of comparator 22, the inverting input of which receives voltage Vin. The output of comparator 22 is connected to terminals 30 and 31 of amplifiers 14 and 13. In the example shown, comparator 22 also has an open collector and is thus associated with a resistor R15 connected between its output and voltage Ve, and with two diodes D3, D4.

An advantage of the present invention is that it enables to limit, during transient periods of abrupt variations of the current surge by the microprocessor, deviations of the supply voltage of the microprocessor, while responding to these variations.

Another advantage of the present invention is that the device does not require any modification of the power converter. In particular, a device according to the invention does not depend upon the converter type (switched-mode supply, linear regulator). In the embodiment shown in FIGS. 2 and 3, the device according to the invention does not interact with the converter per se. No connection is necessary between the converter and the device of the invention.

Figure 4:
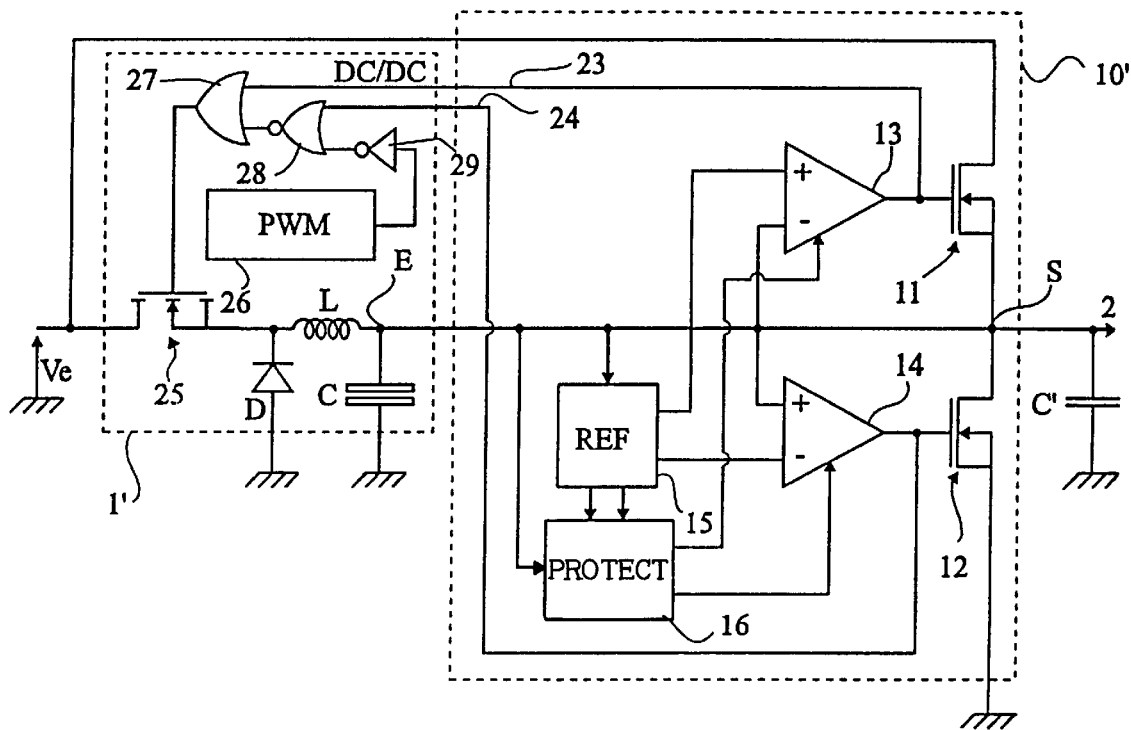
FIG. 4 shows, in the form of block-diagrams, an alternative implementation of a device according to the present invention associated with a power converter of switched-mode supply type.

FIG. 4 shows an alternative embodiment of the device according to the present invention meant for, more specifically, a power converter 1' formed by a switched-mode supply, for example, a voltage step-down transformer. This device 10' is similar to device 10 of FIG. 2. The only difference is that it includes two additional output terminals 23 and 24 directed to power converter 1' to indicate thereto the activation of one of the stages of device 10'. The output of amplifier 13 is connected to terminal 23 and the output of amplifier 14 is connected to terminal 24.

Power converter 1' includes, conventionally, a MOSFET transistor 25 in series with an inductance L, associated with a recovery diode D, between an input terminal receiving voltage Ve and terminal E. Capacitor C has been shown in FIG. 4 within converter 1' since it is linked with its operation. Transistor 25 is, in normal operation, controlled by a conventional unit 26 for modulating the pulsewidth.

According to the present invention, a logic device is interposed between the gate of transistor 25 and the output of unit 26. This device receives the signals carried by outputs 23 and 24 of device 10' and is meant for forcing the control of transistor 25 in case of an activation of one of the stages of device 10'.

For example, the gate of transistor 25 is connected to an "OR" gate (27), a first input of which is connected to output 23 and a second input of which is connected to the output of a "NOR" gate (28). The inputs of gate 28 are connected to terminal 24 and to the output of an inverter 29, the input of which is connected to the output of unit 26. The function of inverter 29 is to invert the pulse train issued by unit 26 to enable the conventional control of transistor 25 when terminals 23 and 24 are in the low state, that is, when the outputs of amplifiers 13 and 14 are at a zero potential, blocking transistors 11 and 12. It should be noted that, in the embodiment shown in FIG. 4, both MOS power transistors of device 10' are N-channel transistors. Thus, the operation of the upper stage is performed with inverted potentials with respect to the operation described in relation with FIG. 3.

When the upper stage is active, that is, in case of an abrupt current surge from load 2, the output of amplifier 13 becomes positive. According to the present invention, MOSFET transistor 25 of power converter 1' is then forced in the on-state by gate 27. Thus, power converter 1' is forced to provide more energy to help it recover, more rapidly than does a conventional converter with its own regulation loop, the predetermined voltage level Vin that it must provide. Conversely, when the lower stage of device 10' is active, the blocking of transistor 25 is forced by gates 27 and 28, which lengthens the duration of the recovery operation of the converter and also helps it decrease more rapidly the amount of energy that it provides and recover the predetermined voltage Vin.

An advantage of this embodiment is that by introducing a reaction of converter 1' to the operation of device 10', the operating periods, and thus the energy dissipation periods of device 10', are reduced.

Figure 5:
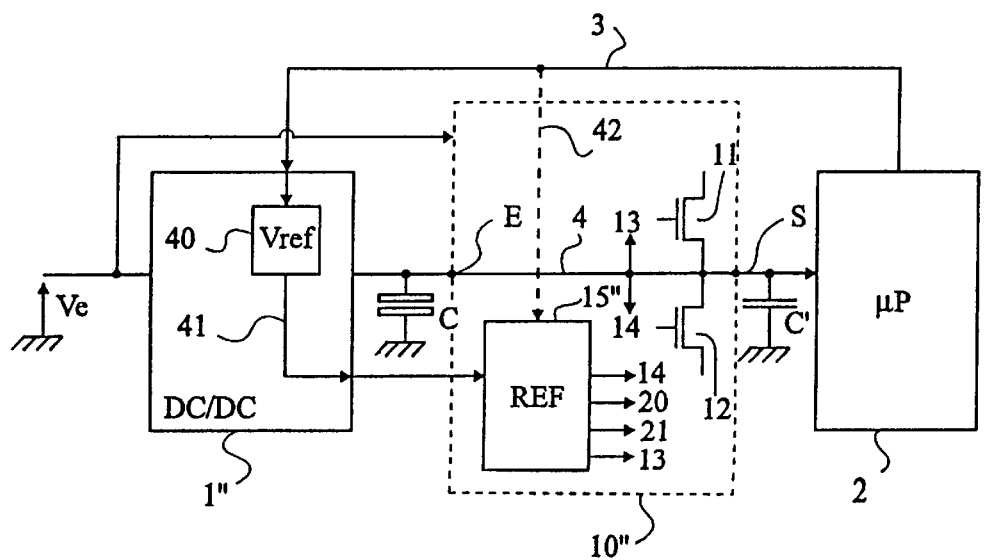
FIG. 5 partially shows, in the form of block-diagrams, a third embodiment of a device according to the present invention associated with a power converter and with a microprocessor.

FIG. 5 shows, in the form of a simplified block-diagram, a third embodiment of a device 10", according to the present invention, for limiting transient variations of the supply voltage of a microprocessor 2, based on a power converter 1". The embodiment shown in FIG. 5 applies to a switched-mode power supply as well as to a linear regulator.

As previously indicated, digital link 3 from microprocessor 2 to converter 1" is used to set a check voltage Vref, based on which converter 1" regulates voltage Vin. According to the embodiment shown in FIG. 5, a block 40 of converter 1" receiving (possibly, via a digital-to-analog converter) the voltage check carried by link 3 includes an output 41 directed to device 10". This output 41 is connected to a block 15" for generating voltages Vin+ΔV, Vin−ΔV, Vin +ΔV', Vin−ΔV' which, according to this embodiment, sets these voltages based on voltage Vref of the converter and not based on filtered voltage Vin.

An advantage of this embodiment is that device 10" reacts almost immediately to a desired modification of voltage Vin while limiting undesired variations.

The modifications to be brought to converter 1" and to device 10" are within the abilities of those skilled in the art based on the indications given hereabove. As a variant, block 15" of device 10" may directly receive (possibly, via a digital-to-analog converter), via a link 42, the check carried by link 3.

Of course, the present invention is susceptible to have various alterations, modifications, and improvements which will readily occur to those skilled in the art. In particular, the sizing of the resistors and capacitors depends on the operating voltage ranges of the device. Further, although the present invention has been described in relation with positive supply voltages, its transposition to a device meant for a load supplied under a negative voltage is within the abilities of those skilled in the art. Moreover, although reference has been made in the foregoing description to converters using an analog check voltage Vref, the present invention also applies to digital converters. Similarly, block 15" may generate the voltages for amplifiers 13 and 14 and comparators 20 and 21 based on a digital voltage reference.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A device to limit transient variations of a load voltage supplied to a load by a dc/dc converter, including:
    an input terminal to receive a voltage provided by the converter;
    an output terminal, electrically connected to the input terminal and the load to supply the load voltage as the voltage provided by the converter;
    a first power transistor connected between a supply voltage of the converter and the output terminal;
    a second power transistor connected between the output terminal and the ground; and
    first and second control means for linearly and individually controlling the first and second power transistors, respectively, in case of an abrupt variation of the load;
    wherein the first and second control means each includes a differential amplifier, each differential amplifier receiving, as inputs, the load voltage and one of a first variable reference voltage and a second variable reference voltage, the first and second variable reference voltages being based on the voltage provided by the converter.

2. A device according to claim 1, including a circuit to generate the first and second variable reference voltages, the circuit including a first resistive and capacitive cell to receive the voltage provided by the converter.

3. A device according to claim 1, including a protection circuit to limit a duration of conduction of each power transistor.

4. A device according to claim 3, wherein the protection circuit includes means for inhibiting the first and second control means after a predetermined duration which follows the operation of one of the first and second control means.

5. A device according to claim 3, wherein the protection circuit includes, for each differential amplifier, a comparator receiving, as inputs, a variable threshold voltage having a value between the one of the first and second variable reference voltages of the differential amplifier with which the comparator is associated and a first filtered voltage based on the voltage provided by the converter and filtered by a first RC cell having a first time constant, and a second filtered voltage based on the voltage provided by the converter and filtered by a second RC cell having a second time constant lower than the first time constant of the first RC cell.

6. A device according to claim 3, wherein the protection circuit further includes means for inhibiting the first and second control means when the voltage provided by the converter is lower than a predetermined threshold.

7. A device according to claim 1, further including two output terminals connected to the dc/dc converter and indicative of the operation of each power transistor.

8. A system for supplying a load, including
    a power converter of a switched-mode supply type controlled by pulse width modulation; and
    the device to limit the transient variations of the load voltage according to claim 1,
    wherein the power converter includes means for forcing its own control during an activation of one of the power transistors.

9. A system according to claim 8, wherein the device includes two output terminals connected to the power converter and indicative of the operation of each power transistor.

10. A system for supplying a load, including
    a power converter, forming a linear converter of an input voltage on a reference value, and;
    the device to limit the variations of the load voltage according to claim 1.

11. A device to limit transient variations of a load voltage supplied to a load by a dc/dc converter, comprising:
    an input terminal that receives a voltage provided by the converter;
    an output terminal connected to the load to supply the load voltage;
    a line conductor electrically connecting the input terminal and the output terminal;
    a first power transistor coupled between a supply voltage of the converter and the output terminal;
    a second power transistor connected between the output terminal and a predetermined reference potential; and
    a control circuit coupled to and for individually controlling each power transistor in case of a variation of the load;
    said control circuit comprising first and second circuits coupled to and for respectively controlling said first and second power transistors, each of said first and second circuits being responsive to the load voltage and one of a first variable reference voltage and a second variable reference voltage, the first and second variable reference voltages being based on the voltage provided by the converter.

12. A device according to claim 11 wherein said predetermined reference potential is ground.

13. A device according to claim 11 wherein said first and second circuits each comprise a differential amplifier having a pair of inputs for receiving said load voltage and said one of the first and second variable reference voltages.

14. A device according to claim 13 wherein said differential amplifiers each have inverting and non-inverting inputs and an output that couples to a respective power transistor.

15. A device according to claim 14 wherein the load voltage is applied to an inverting input of the first differential amplifier, and to a non-inverting input of the second differential amplifier.

16. A device according to claim 15 wherein the non-inverting input of the first differential amplifier receives the first variable reference voltage, and the inverting input of the second differential amplifier receives the second variable reference voltage.

17. A device according to claim 16 wherein said first variable reference voltage is a given magnitude less than the voltage provided by the converter, and said second variable reference voltage is a like given magnitude greater than the voltage provided by the converter.

18. A device according to claim 11 including a circuit for generating the variable reference voltages and receiving, via a first resistive and capacitive cell, the voltage provided by the converter.

19. A device according to claim 11, including a protection circuit to limit a duration of conduction of each power transistor.

20. A device according to claim 19 wherein the protective circuit includes a circuit for inhibiting the operation of the control circuit of the power transistors after a predetermined duration.

21. A device according to claim 20 wherein said first and second circuits each comprise a differential amplifier.

22. A device according to claim 21 wherein the protection circuit includes, for each differential amplifier, a comparator receiving, as inputs, a variable threshold voltage having a value between the one of the first and second variable reference voltages of the differential amplifier with which the comparator is associated and a first filtered voltage based on the voltage provided by the converter and filtered by a first RC cell having a first time constant, and a second filtered voltage based on the voltage provided by the converter and filtered by a second RC cell having a second time constant lower than the first time constant of the first RC cell.

23. A device according to claim 19, wherein the protection circuit further includes means for inhibiting the control circuit when the voltage provided by the converter is lower than a predetermined threshold.

24. A device according to claim 11, further including two output terminals connected to the dc/dc converter and indicative of the operation of each power transistor.

25. A system for supplying a load, including a power converter of a switched-mode supply type controlled by pulse width modulation; and the device to limit the variations of the load voltage according to claim 11, wherein the converter includes means for forcing its own control during an activation of one of the power transistors.

26. A system according to claim 25, wherein the device includes two output terminals connected to the power converter and indicative of the operation of each power transistor.

27. A system for supplying a load, including:

a power converter, forming a linear converter of an input voltage on a reference value; and the device to limit the variations of the load voltage according to claim 11.

28. A device according to claim 11 including a single chemical capacitor disposed between the output of the converter and ground.

29. A device according to claim 28 including a decoupling capacitor disposed between the load terminal and ground.

* * * * *